United States Patent
Ebeling et al.

(10) Patent No.: US 9,605,472 B2
(45) Date of Patent: Mar. 28, 2017

(54) CONNECTING MEANS COMPRISING A HATCH AND A BELLOWS

(71) Applicant: Airbus Operations GmbH, Hamburg (DE)

(72) Inventors: Stefan Ebeling, Wilhemshaven (DE); Jens Gärtner, Hamburg (DE); Andreas Köhler, Hamburg (DE); Raj Kotian, Hamburg (DE); Ralph Hoffmann, Werle (DE)

(73) Assignee: Airbus Operations GmbH (DE)

( * ) Notice: Subject to any disclaimer, the term of this patent is extended or adjusted under 35 U.S.C. 154(b) by 316 days.

(21) Appl. No.: 14/306,336

(22) Filed: Jun. 17, 2014

(65) Prior Publication Data

US 2014/0367055 A1 Dec. 18, 2014

(30) Foreign Application Priority Data

Jun. 17, 2013 (EP) .................................... 13172371

(51) Int. Cl.
*B64D 13/00* (2006.01)
*E06B 3/94* (2006.01)
(Continued)

(52) U.S. Cl.
CPC .................. *E06B 3/94* (2013.01); *B64C 1/18* (2013.01); *B64D 11/0007* (2013.01);
(Continued)

(58) Field of Classification Search
CPC .... E06B 3/94; E06B 9/262; E06B 2009/2625; B64D 11/04; B64D 11/0007; B64C 1/18
See application file for complete search history.

(56) References Cited

U.S. PATENT DOCUMENTS 4,452,465 A * 6/1984 Bourke .............. B62D 53/0828
280/403
4,860,665 A * 8/1989 Schmidt .................. B29C 71/04
105/18

(Continued)

FOREIGN PATENT DOCUMENTS

CA 2125604 A1 * 12/1995
DE 102 04 892 A1 8/2003
(Continued)

OTHER PUBLICATIONS

"Front end gangways", Hubner, Oct. 2004.*
EP 13 17 2371 search report (Oct. 24, 2013).

*Primary Examiner* — Brian M O'Hara
*Assistant Examiner* — Assres H Woldemaryam
(74) *Attorney, Agent, or Firm* — Lerner, David, Littenberg, Krumholz & Mentlik, LLP

(57) ABSTRACT

A connecting means provides a connecting passage between a first compartment of a vehicle and a storage means located in a second compartment of the vehicle. The first and the second compartment are separated by a wall. A catering system for a vehicle includes the connecting means. A method provides a sealed connecting passage between a first compartment of a vehicle and a storage means located in second compartment of a vehicle. The connecting means includes a frame, a hatch arrangement for selectively closing and opening a frame aperture with a hatch cover and a bellows arrangement including a flexible bellows. The flexible bellows can be extended from the frame to a storage means located in the second compartment of the vehicle. A continuous passage defined by the flexible bellows and the frame provides a sealed connecting passage between the first compartment and the storage means.

13 Claims, 3 Drawing Sheets

(51) Int. Cl.
- *B64D 11/04* (2006.01)
- *E06B 9/262* (2006.01)
- *B64D 11/00* (2006.01)
- *B64C 1/18* (2006.01)

(52) U.S. Cl.
CPC .............. *B64D 11/04* (2013.01); *E06B 9/262* (2013.01); *E06B 2009/2625* (2013.01)

(56) References Cited

U.S. PATENT DOCUMENTS

| | | | | |
|---|---|---|---|---|
| 4,948,157 | A * | 8/1990 | Thudt | B62D 47/025 |
| | | | | 280/494 |
| 5,074,496 | A * | 12/1991 | Rezag | B65G 1/0407 |
| | | | | 105/327 |
| 5,456,186 | A * | 10/1995 | Hubner | B61D 17/22 |
| | | | | 105/18 |
| 6,152,287 | A * | 11/2000 | Luria | B64D 9/00 |
| | | | | 198/465.1 |
| 6,454,208 | B1 * | 9/2002 | Nervig | B64D 9/003 |
| | | | | 244/118.1 |
| 6,808,142 | B2 * | 10/2004 | Oki | B64C 1/20 |
| | | | | 244/118.1 |

FOREIGN PATENT DOCUMENTS

| | | |
|---|---|---|
| DE | 10 2009 040729 A1 | 3/2011 |
| EP | 0 443 897 A1 | 8/1991 |
| FR | 2 950 605 A1 | 4/2011 |

* cited by examiner

CONNECTING MEANS COMPRISING A HATCH AND A BELLOWS

BACKGROUND OF THE INVENTION

The present invention relates to a connecting means for providing a connecting passage between a first compartment of a vehicle and a storage means located in a second compartment of the vehicle. Further, the invention relates to a catering system for a vehicle comprising a galley, a storage means and a connecting means. It also relates to a vehicle comprising a catering system and a method for providing a sealed connection between a first compartment of a vehicle and a storage means located in a second compartment of the vehicle.

The provision of additional seating space for passengers on board aircraft is an ongoing issue as the cost effectiveness of passenger aircraft largely depends on the number of passengers that can be seated. Current aircraft galleys and especially the storage space required for food and beverage take up considerable amount of space. It has, therefore, been suggested to replace the storage racks currently located in the passenger compartment with special storage racks located in a removable storage means, i.e. a container, in the cargo compartment of the aircraft. In that case a connecting means between the passenger compartment and the interior of the exchangeable storage means located in the cargo bay or cargo compartment of the aircraft is required.

The connecting means has to provide an airtight sealing of the passenger compartment and the interior of the storage means with respect to the cargo compartment, as a cargo bay of an aircraft will be flooded with Halon if a potential fire hazard is detected in the cargo bay. However, the Halon must not enter the passenger compartment i.e. the passenger cabin. Further, the connecting means has to be releasable such that the storage means can be easily exchanged and replaced.

Similar considerations generally apply to other vehicles then aircraft and to other types of compartments.

BRIEF SUMMARY OF THE INVENTION

An aspect of the present invention provides a connecting means for connecting a first compartment and a storage means located in a second compartment that meets safety demands and can be quickly and easily operated. In particular it shall take into consideration the specific demands and meet the safety regulations imposed on civil aviation.

An embodiment of the present invention solves this problem by a connecting means for providing a connecting passage between a first compartment of a vehicle and a storage means located in a second compartment of the vehicle. The first and the second compartment are separated by a wall. The connecting means comprises a frame enclosing a frame aperture and extending in a frame plane, a hatch arrangement mounted to the frame for selectively closing and opening the frame aperture and comprising at least a first hatch cover and a bellows arrangement mounted to the frame and comprising a flexible bellows. The first hatch cover is movable parallel to the frame plane between an opened position and a closed position. The flexible bellows and the frame enclose a continuous passage terminating at one end at the frame aperture. The flexible bellows can be selectively extended from a retracted position to an extended position in a direction transverse to the frame plane. Further, the connecting means is adapted to be arranged in an aperture in a wall of a vehicle between a first and a second compartment such that the frame plane extends parallel to the wall and the hatch arrangement is arranged between the flexible bellows and the first compartment. As such, the flexible bellows can be extended from the frame to a storage means located in the second compartment of the vehicle, whereby the continuous passage defined by the flexible bellows and the frame provides a sealed connecting passage between the first compartment and the storage means.

Thus, in operation a connecting means or connection means according to an embodiment of the present invention provides a connecting passage between a first compartment of a vehicle and a storage means located in a second compartment of the vehicle. The vehicle may, for example, be an aircraft or a passenger train comprising a passenger cabin or passenger compartment corresponding to the first compartment and a cargo bay or cargo compartment corresponding to the second compartment. A wall within the meaning of the present invention can be any kind of means separating the first from the second compartment e.g. the floor of a passenger cabin or the rear wall of a passenger cabin. However, it has to be a pointed out that the vehicle and any parts thereof such as the compartments and the wall do not form part of the connecting means but are illustrated here to facilitate understanding of the present invention.

In operation a storage means is located in the second compartment of the vehicle. The storage means can be, for example, a conventional container or unit load device for aircraft such as an LD3 or LD6 container used for transporting cargo or luggage in the cargo bays of wide-body aircraft. The storage means can, for example, be removable from the second compartment of the vehicle and can be exchanged for another identical or similar storage means. However, it is also possible that the storage means is permanently located in the second compartment. The storage means also does not form part of the connecting means according to an embodiment of the present invention.

The frame aperture is preferably of rectangular or quadratic shape. In other embodiments the frame aperture has a circular or oval outer circumference or any other kind of irregular or regular shape. The frame may form the base of the connecting means and provide mounting means to attach the connecting means to the wall of a vehicle.

Attached or mounted to the frame is a hatch arrangement for selectively closing and opening the frame aperture. Thus, the hatch arrangement provides means for selectively allowing or denying access or a transfer of e.g. goods, persons or even gases through the frame aperture. The hatch arrangement comprises at least a first hatch cover that is movable parallel to the frame plane between an opened position and a closed position. The hatch cover can be moved to the closed position for closing the frame aperture or at least parts of the frame aperture and it can also be moved to an opened position in which the frame aperture is not blocked by the first hatch cover. While moving between the opened position and the closed position the hatch cover carries out a translational movement along the frame plane. A movement parallel to the frame plane does not exclude movement components transverse to the frame plane. However, a mere pivoting movement about an axis extending parallel to the frame plane is not to be construed as a translational movement in the above sense.

The connecting means further comprises a bellows arrangement mounted or attached to the frame. The bellows arrangement comprises a flexible bellows or gaiter. A flexible bellows can be, for example, a kind of pipe or tube made from a flexible material such as rubber or polyurethane and comprise stiffening means such as a metal rings. A length of the flexible bellows can be altered or adapted between an extended and a retracted position such that the length of a passage formed by the flexible bellows changes. In some embodiments the flexible bellows can also be deformed in directions transverse to the extension direction of the passage formed by the bellows. Thus, the passage of the flexible bellows does not necessarily have to extend in a straight line but may also follow any kind of curved line. However, in an exemplary preferred embodiment a curvature of the flexible bellows is restricted such that a straight passage having a predefined free cross-sectional area for transporting goods between the storage means and the first compartment is always maintained.

The flexible bellows and the frame enclose a continuous passage that terminates at one end in the frame aperture. The other end of the continuous passage is preferably formed by a free end of the flexible bellows. The latter can be selectively extended between a retracted and an extended position in the direction transverse to the frame plane. In the retracted position the length of the continuous passage is shorter than the length of the continuous passage in the extended position. When extending the flexible bellows from the retracted to the extended position, the free end of the flexible bellows moves away from the frame plane.

The connecting means is adapted to be arranged or mounted in an aperture or opening in a wall of a vehicle between a first and a second compartment such that the frame plane extends parallel to the wall. In an exemplary embodiment the connecting means is adapted to be arranged in the floor of an aircraft separating a passenger cabin from a cargo bay. In an exemplary preferred embodiment the connecting means does not protrude out of the wall into either compartment with the flexible bellows in the retracted position i.e. the hatch arrangement does not take up any space for loading and unloading storage means in the second compartment or for installing monuments in the first compartment.

Thus, the first hatch cover can be moved between an opened and a closed position parallel to the wall and, preferably, inside the wall. In an exemplary embodiment of an aircraft comprising the present connecting means a monument comprising a transportation means for transporting goods stored in a storage means in the second compartment to the first compartment can be mounted on top of the connecting means.

Further, in operation the connecting means is arranged in the wall such that the hatch arrangement is arranged or located between the bellows arrangement and the first compartment. Thus, the flexible bellows can be advantageously extended and/or retracted while the hatch arrangement closes the frame aperture. The flexible bellows can be extended from the frame to a storage means located in the second compartment of the vehicle, whereby after opening in the hatch arrangement the continuous passage defined by the flexible bellows and the frame provides a sealed connecting passage between the first compartment and the storage means.

Once the storage means has been arranged in the second compartment at a predetermined position, the flexible bellows can be extended towards the storage means and can provide a sealed passage between the storage means and the connecting means. Then, the hatch arrangement can be used to selectively open the frame aperture to provide a sealed passage. A flexible bellows is advantageously operable to connect to storage means that are not positioned exactly at the predetermined position i.e. allowing for a certain flexibility in the positioning of the storage means and, therefore, faster loading and unloading of the storage means.

By providing a sealed passage between the first compartment and the storage means advantageously no heat or little heat is lost from a first compartment to an unheated second compartment by convection. Further, advantageously no gas is exchanged between the first and the second compartment i.e. any odours and the like present in a cargo compartment of an aircraft do not affect the comfort of passengers in the passenger compartment. Further, the cargo compartment can be flooded with Halon in case a potential fire hazard is detected without putting the health of passengers at risk. In addition the hatch arrangement advantageously provides a means for selectively closing the frame aperture and thereby the continuous passage when no storage means is located in the second compartment or when no goods have to be transported between the first compartment and the storage means in either direction, thereby maintaining or allowing for a sealed separation of the compartments.

In a preferred embodiment the hatch arrangement comprises a second hatch cover adapted for translational movement along the frame plane between an opened and a closed position, wherein the first hatch cover in the closed position abuts the second hatch cover in the closed position such that the frame aperture is closed, and wherein the first hatch cover in the opened position is spaced apart from the second hatch cover in the opened position such that the frame aperture is open. The first and the second hatch cover preferably move in opposite directions between their respective closed and opened positions.

In an alternative exemplary embodiment the hatch arrangement comprises only a first hatch cover. Providing only a single hatch cover advantageously allows an easier and a tighter sealing of the first compartment from the second compartment.

In a preferred exemplary embodiment the first and/or the second hatch cover are formed as roller blinds or roller aprons. Using roller blinds or roller aprons as movable hatch covers requires only little additional lateral space to store the hatch covers in the opened position. Thus, this preferred exemplary embodiment provides a compact and space-saving hatch arrangement.

The hatch arrangement preferably comprises biasing means for biasing the first and/or the second hatch cover to the closed position. The biasing means is preferably formed as a gas spring. In an exemplary embodiment, each hatch cover is biased by its own biasing means towards the respective closed position. In an alternative embodiment a single biasing means is provided biasing the first and the second hatch cover towards the respective closed position. Providing a biasing means preferably provides a fail-safe sealed separation of the first and the second compartment when no hydraulic or electric power is present to move the hatch covers. Further, the biasing means do not require any operator interaction but may close automatically in the event of power loss.

Preferably, the hatch arrangement comprises automatic actuation means for moving the first and/or the second hatch cover from the closed to the opened position, wherein the actuation means is preferably a cable drive moving the first and/or the second hatch cover by cable. It is further preferred to provide a manual actuation means for moving the first and/or the second hatch cover from the closed to the opened position, wherein the manual actuation means is preferably a cable drive moving the first and/or the second hatch cover by cable. The manual actuation means is preferably provided to override the automatic actuation means such that the hatch cover can be opened and closed by an operator in case of failure of the automatic actuation means or in the event of power loss. Alternatively, the automatic and/or manual actuation means can, for example, also be formed as a linear drive or a hydraulic drive.

In a further preferred embodiment the hatch arrangement is adapted to provide an airtight sealing of the frame aperture when the first and/or the second hatch cover are in the closed position. Thus, gas exchange through the frame and, thus, in operation between the first and second compartment is advantageously prevented when the first and/or the second hatch cover are in the closed position.

In a preferred embodiment the bellows arrangement comprises a biasing means for biasing the flexible bellows to the extended position. Thus, in the event of a power loss a sealed connection between the first compartment of the vehicle and the storage means located in the second compartment is maintained. When a new storage means has been moved into the second compartment the flexible bellows can be extended without requiring any actuation means that extends the flexible bellows. Further, by using a biasing means a predefined contact pressure can be maintained.

It is further preferred that the bellows arrangement comprises a gasket adapted for providing an airtight sealing between the flexible bellows and an outer surface of a storage means located in the second compartment of a vehicle. The gasket advantageously ensures that the interior of the storage means and the first compartment are connected by a sealed passage.

In an exemplary preferred embodiment the bellows arrangement comprises a connector for supplying power and/or data to the storage means located in the second compartment, wherein the connector is preferably arranged at a free end of the flexible bellows and can be moved with the flexible bellows towards the storage unit.

A preferred embodiment of a connecting means comprises a bellows arrangement having an automatic actuation means for retracting the flexible bellows from the extended to a retracted position. It is further preferred that the bellows arrangement comprises a manual actuation means for retracting the flexible bellows from the extended to the retracted position. The manual actuation means can advantageously be used to retract the flexible bellows in the event of power loss, thus overriding the automatic actuation means.

In another aspect the invention relates to a catering system for a vehicle having a first and a second compartment separated by a wall, the catering system comprising a galley adapted to be arranged in the first compartment of the vehicle, a storage means adapted to be located in the second compartment of the vehicle and a connecting means according to any of the preceding embodiments adapted to be arranged in a wall of the vehicle separating the first and the second compartment, such that the frame plane extends parallel to the wall and the hatch arrangement is arranged between the flexible bellows and the first compartment, such that the flexible bellows can be extended from the frame to the storage means located in the second compartment of the vehicle, whereby the continuous passage defined by the flexible bellows and the frame provides the sealed connecting passage between the galley and the storage means.

The catering system advantageously allows storing e.g. food and beverage for supplying passengers of an aircraft in a container in a cargo bay of an aircraft. Food and beverage can be moved from the storage means into the first compartment of the vehicle e.g. a passenger cabin without enabling gas exchange between the first and the second compartment. Further, the storage space required for food and beverage in the first compartment is reduced such that additional seats can be placed in the first compartment and, thus, more passengers can be transported with the same vehicle. The catering system further shares the advantages of the respective embodiments of a connecting means according to the present invention.

In another aspect the present invention relates to a vehicle having a first and a second compartment separated by a wall. The vehicle comprises a catering system according to any of the above embodiments, wherein the galley is arranged in the first compartment, the storage means is arranged in the second compartment and the connecting means is arranged in the wall of the vehicle such that the frame plane extends parallel to the wall and such that the hatch arrangement is arranged between the flexible bellows and the first compartment, such that the flexible bellows can be selectively extended from the frame to the storage means located in the second compartment of the vehicle, whereby the continuous passage defined by the flexible bellows and the frame provides the sealed connecting passage between the first compartment and the storage means.

In a preferred embodiment the first compartment is a passenger compartment or passenger cabin and the second compartment is a cargo compartment or cargo bay. Further, the wall is preferably a floor portion of the vehicle and, in operation of the vehicle, the first compartment is arranged above the second compartment. The vehicle is preferably an aircraft.

The vehicle according to an embodiment of the present invention shares the advantages of the respective embodiments of a catering system and a connecting means according to the present invention.

In another aspect the present invention relates to a method for providing a sealed connection between a first compartment of a vehicle and a storage means located in a second compartment of the vehicle, wherein the first and second compartment are separated by a wall. The method comprises the steps of:
  arranging a connecting means according to any of the preceding embodiments in the wall of the vehicle, such that the frame plane extends parallel to the wall and the hatch arrangement is arranged between the bellows arrangement and the first compartment, the hatch arrangement closes the frame aperture and the flexible bellows is in a retracted position,
  locating a storage means in the second compartment of the vehicle,
  extending the flexible bellows such that a continuous sealed passage is provided between the frame and the storage means and
  moving the at least one hatch cover to an opened position for selectively opening the frame aperture such that the continuous passage defined by the flexible bellows and the frame provides the sealed connecting passage between the galley and the storage means.

The method according to an aspect of the present invention shares the advantages of the respective embodiments of a connecting means, a galley and/or a vehicle according to the present invention.

BRIEF DESCRIPTION OF THE DRAWINGS

An exemplary embodiment of a vehicle according to the present invention comprising an exemplary embodiment of a catering system according to the present invention and a preferred exemplary embodiment of a connecting means according to the present invention will now be described with reference to the drawings, wherein.

DETAILED DESCRIPTION

A preferred embodiment of a connecting means included in a catering system according to an embodiment of the present invention and a vehicle according to an embodiment of the present invention will now be described in detail with reference to FIGS. 1 to 4b. In the Figures like numerals refer to like elements.

Figure 1:
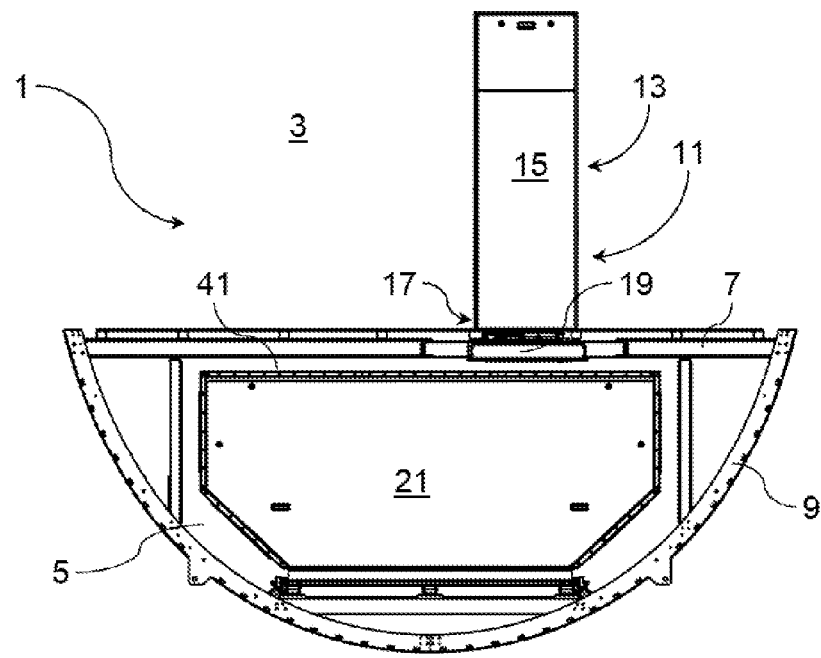
FIG. 1 is a sectional view of an exemplary embodiment of a vehicle according to the present invention.

FIG. 1 shows a section of a vehicle 1 according to an embodiment of the present invention. The vehicle 1 is a passenger aircraft 1 comprising a first compartment 3 and a second compartment 5. The first compartment 3 is arranged above the second compartment 5. In the present embodiment the first compartment 3 is a passenger cabin or passenger compartment 3. The second compartment 5 is a cargo bay or cargo compartment 5. The first and the second compartment 3, 5 are separated by a wall 7 representing the floor 7 of the passenger cabin 3 and the ceiling 7 of the cargo compartment 5. A lower section of a hull 9 of the aircraft 1 is shown for illustrative purposes.

A catering system 11 according to an embodiment of the present invention is arranged in the aircraft 1. The catering system 11 comprises a galley 13. Galleys 13 commonly comprise a plurality of monuments 15 that provide storage place for food and beverage, ovens, beverage makers, refrigerators and the like. Here, only a single monument 15 is shown for exemplary purposes.

In an opening or aperture 17 in the wall 7 of the aircraft 1, an exemplary embodiment of a connecting means 19 is arranged. The connecting means 19 provides a continuous sealed passage between the first compartment 3 and a storage means 21 located in the second compartment 5 of the aircraft 1. In the exemplary embodiment shown in the Figs. the storage means 21 is shown as a LD6 container. However, it is also conceivable that the storage means 21 is a LD3 container or any other kind of storage means 21 that can be arranged in a cargo bay or cargo compartment 5 of an aircraft 1.

The connecting means 19 will now be explained in more detail with reference to FIGS. 2a to 4b. The connecting means 19 can be best seen in FIGS. 4a and 4b which show the connecting means 19 not installed in the wall 7. The connecting means 19 comprises a frame 23 extending in a frame plane and surrounding a frame aperture 25. The frame 23 comprises mounting means 27 for attaching the connecting means 19 to a wall 7 of an aircraft 1. In the mounted state the frame plane extends parallel to the wall 7 as can be seen best in FIGS. 1, 2a and 2b.

Figure 3A:
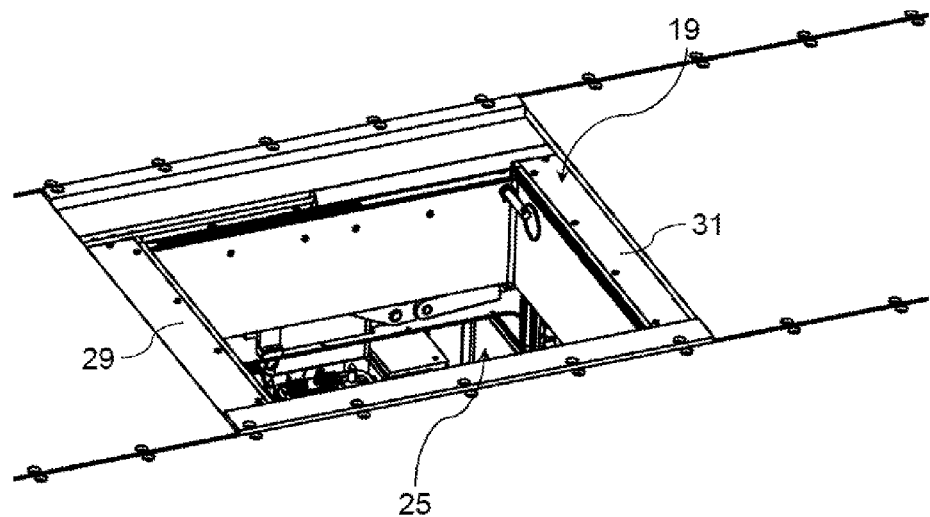
FIG. 3a is a perspective view of an exemplary embodiment of a connecting means comprising two hatch covers in an opened position.
Figure 3B:
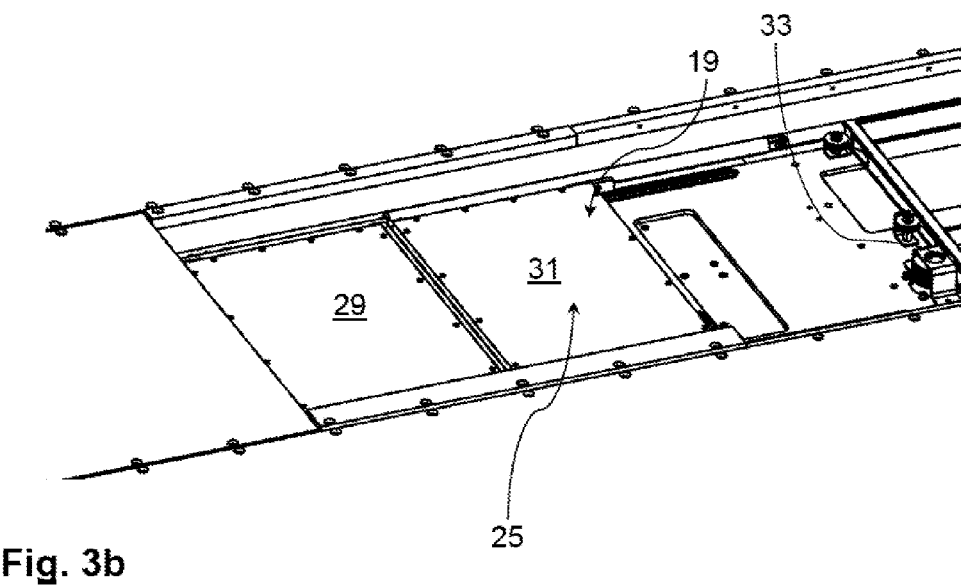
FIG. 3b is a perspective view of the embodiment of a connecting means comprising two hatch covers in a closed position.

Attached to the frame 23 is a hatch arrangement for selectively closing and opening the frame aperture 25 as can be seen in FIGS. 3a and 3b. The hatch arrangement comprises two hatch covers 29, 31 that can be moved parallel to the frame plane between a closed position (FIG. 3b) and an opened position (FIG. 3a) by an actuation means 33. When the hatch covers 29, 31 are in the respective closed positions, the first hatch cover 29 abuts the second hatch cover 31 and the hatch arrangement preferably provides an airtight sealing of the frame aperture 25. When the hatch covers 29, 31 have been moved into their respective opened position the first hatch cover 29 is spaced apart from the second hatch cover 31.

In the present embodiment the actuation means 33 is an electric cable drive adapted to move the hatch covers 29, 31 between the closed and the opened position by a cable. However, in alternative exemplary embodiments other driving means such as a linear drive or a hydraulic drive can be used. The cable drive 33 comprises a manual actuation mode to override the electric drive to move the hatch covers 29, 31 between the respective closed and opened positions in the event of a power loss. Further, a biasing means in form of a gas spring (not shown) is provided for biasing the hatch covers 29, 31 to the closed position such that in the event of power loss the hatch covers 29, 31 automatically move in the closed position, provide an airtight sealing of the frame aperture 25 and seal the passenger compartment 3 from the cargo compartment 5. Thereby, advantageously an accidental gas exchange between the first compartment 3 and the second compartment 5 is prevented even in the event of power loss e.g. when the second compartment is flooded with Halon to extinguish a potential fire hazard.

The connecting means 19 further comprises a bellows arrangement 35 comprising a flexible bellows or gaiter 37. The flexible bellows 37 and the frame 23 enclose a continuous passage terminating at one end in the frame aperture 25. The other end of the continuous passage is formed by a free end 39 of the flexible bellows 37.

Figure 2A:
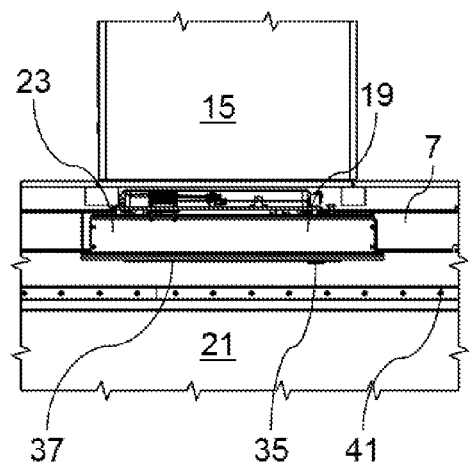
FIG. 2a is an enlarged view of a section of the exemplary embodiment of FIG. 1 comprising a flexible bellows in a retracted position.
Figure 2B:
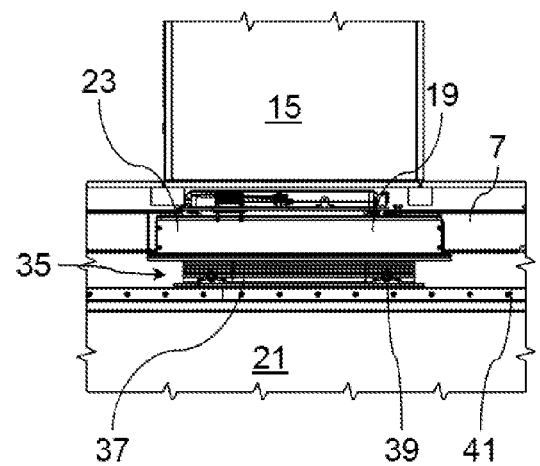
FIG. 2b is an enlarged view of a section of the exemplary embodiment shown in FIG. 1 with the flexible bellows in an extended position.
Figure 4A:
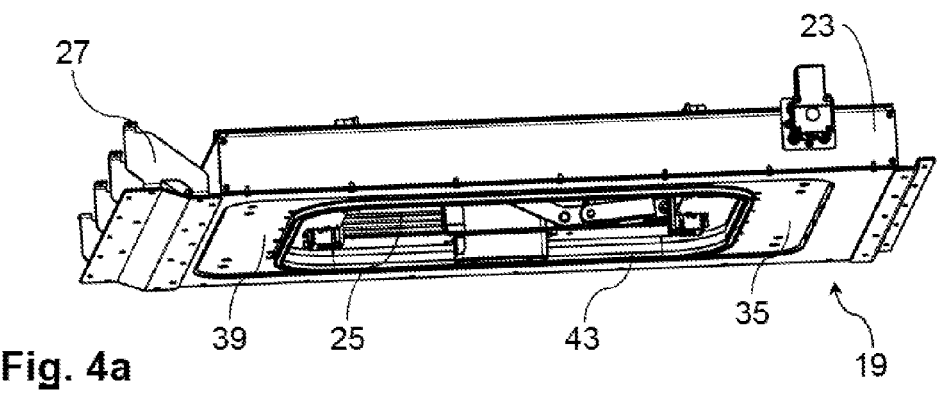
FIG. 4a is a perspective view of the embodiment of a connecting means comprising a flexible bellows in a retracted position.
Figure 4B:
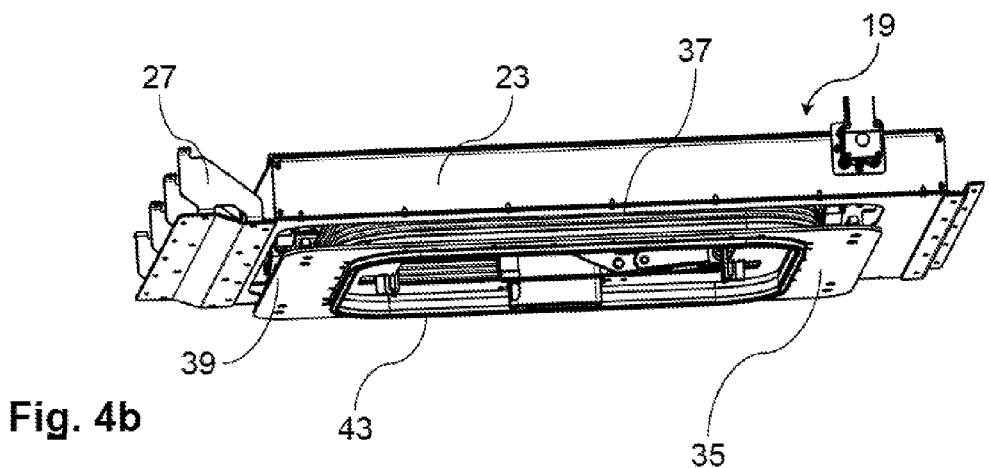
FIG. 4b is a perspective view of the embodiment of a connecting means comprising a flexible bellows in the retracted position.

The flexible bellows 37 can be extended between a retracted position (FIGS. 1, 2a, 4a) and an extended position (FIGS. 2b, 4b). In the retracted position a free end 39 of the flexible bellows 37 is flush with the frame 23 and does not protrude out of the wall 7 towards the second compartment 5. Thereby, the bellows arrangement 35 does advantageously not reduce the space available for loading and unloading storage means 21 into the second compartment 5.

In an extended position the free end 39 of the flexible bellows 37 can be brought into contact with an outer surface 41 of a storage means 21 arranged or located in a second compartment 5 of a vehicle 1. Attached to the free end 39 of the flexible bellows 37 is a gasket 43 for providing an airtight sealing between the flexible bellows 37 and the outer surface 41 of the storage means 21. Thus, when an aperture in the outer surface 41 of the storage means 21 that is surrounded by the free end 39 of the flexible bellows 37 is opened and the hatch arrangement is also in an opened position a continuous sealed passage is provided between the interior of the storage means 21 and the first compartment 3 of the vehicle 1. Thus, food, beverages and other goods stored in the storage means 21 can be transported by a transporting means arranged in the monument 15 into the first compartment 3 without any gas exchange taking place between the first and the second compartment 3, 5. Thereby, the comfort of passengers travelling in the first compartment 3 is not reduced by any unpleasant odors or the like present in the second compartment 5. Further, safety regulations with regard to a gas tight separation of passenger and cargo compartments 3, 5 of civil aircraft are met.

The bellows arrangement 35 preferably comprises a biasing means (not shown) for biasing the flexible bellows 37 towards the extended position such that in the event of power loss advantageously a continuous sealed passage is maintained.

In operation, a connecting means 19 is installed or arranged in an aperture or opening 17 in a wall 7 of a vehicle 1. The connecting means 19 is installed such that the hatch arrangement comprising the hatch covers 29, 31 is arranged between the bellows arrangement 35 and the first compartment 3. Then, a storage means 21 is moved into a predetermined position inside the second compartment 5 of the vehicle 1. The flexible bellows 37 is then extended from the retracted into the extended position such that the gasket 43 arranged on the free end 39 of the flexible bellows 31 engages with the outer surface 41 of the storage means 21 and provides an airtight sealing. Then, the hatch covers 29, 31 are moved from the closed position in which they provide an airtight sealing of the first compartment 3 from the second compartment 5 to the opened position and a continuous sealed passage is provided between the first compartment 3 and the storage means 21. Thereby, advantageously the storage space required in the first compartment 3 of the vehicle 1 is reduced and more seats and, thus, passengers can be accommodated in the first compartment 3.

The invention claimed is:

1. An aircraft comprising:
   a first compartment;
   a second compartment separated by a wall; and
   a connecting means for providing a connecting passage between the first compartment and a storage means located in the second compartment, the connecting means comprising:
   a frame enclosing a frame aperture and extending in a frame plane;
   a hatch arrangement mounted to the frame for selectively closing and opening the frame aperture and comprising at least a first hatch cover, the first hatch cover being movable parallel to the frame plane between an opened position and a closed position;
   a bellows arrangement mounted to the frame and comprising a flexible bellows, wherein the flexible bellows and the frame enclose a continuous passage terminating at one end in the frame aperture and wherein the flexible bellows has at least a retracted position and an extended position in a direction transverse to the frame plane; and
   wherein the connecting means is arranged in an aperture in the wall between the first and the second compartment such that the frame plane extends parallel to the wall and the hatch arrangement is arranged between the flexible bellows and the first compartment, such that, in the extended position the flexible bellows is extends from the frame to a storage means located in the second compartment, whereby the continuous passage defined by the flexible bellows and the frame provides a sealed connecting passage between the first compartment and the storage means.

2. The aircraft according to claim 1, wherein the hatch arrangement comprises a second hatch cover movable parallel to the frame plane between an opened position and a closed position, wherein the first hatch cover in the closed position abuts the second hatch cover in the closed position such that the frame aperture is closed, and wherein the first hatch cover in the opened position is spaced apart from the second hatch cover in the opened position such that the frame aperture is open.

3. The aircraft according to claim 1, wherein the hatch arrangement comprises biasing means for biasing at least one of the first and the second hatch cover to the closed position.

4. The aircraft according to claim 2, wherein the hatch arrangement comprises at least one of an automatic and a manual actuating means for moving at least one of the first and/or the second hatch cover from the closed to the opened position.

5. The aircraft according to claim 2, wherein the hatch arrangement establishes an airtight sealing of the frame aperture when at least one of the first and the second hatch cover is in the closed position.

6. The aircraft according to claim 1, wherein the bellows arrangement comprises a biasing means for biasing the flexible bellows to the extended position.

7. The aircraft according to claim 1, wherein the bellows arrangement comprises a gasket establishing an airtight sealing between the flexible bellows and an outer surface of a storage means located in the second compartment.

8. The aircraft according to claim 1, wherein the bellows arrangement comprises at least one of an automatic and a manual actuation means for retracting the flexible bellows from the extended to the retracted position.

9. An aircraft comprising:
   a first compartment;
   a second compartment separated by a wall; and
   a catering system comprising:
   a galley adapted to be arranged in a the first compartment of the aircraft;
   a storage means located in the second compartment of the aircraft;
   a connecting means comprising:
   a frame enclosing a frame aperture and extending in a frame plane;
   a hatch arrangement mounted to the frame for selectively closing and opening the frame aperture and comprising at least a first hatch cover, the first hatch cover being movable parallel to the frame plane between an opened position and a closed position; and
   a bellows arrangement mounted to the frame and comprising a flexible bellows, wherein the flexible bellows and the frame enclose a continuous passage terminating at one end in the frame aperture and wherein the flexible bellows has at least a retracted position and an extended position in a direction transverse to the frame plane,
   wherein the connecting means is arranged in the wall such that the frame plane extends parallel to the wall and the hatch arrangement is arranged between the flexible bellows and the first compartment, such that, in the extended position, the flexible bellows extends from the frame to the storage means located in the second compartment, whereby the continuous passage defined by the flexible bellows and the frame provides a sealed connecting passage between the galley and the storage means.

10. The aircraft according to claim 1, wherein the first compartment is a passenger compartment and the second compartment is a cargo compartment.

11. The aircraft according to claim 1, wherein the wall is a floor portion of the aircraft and, in operation of the aircraft, the first compartment is arranged above the bellows arrangement.

12. The aircraft according to claim 3, wherein the biasing means comprises a gas spring.

13. The aircraft according to claim 4, wherein the actuating means comprises a cable drive moving at least one of the first and the second hatch cover by cable.

* * * * *